(12) United States Patent
Schmidt (10) Patent No.: US 12,343,757 B2
(45) Date of Patent: Jul. 1, 2025

(54) LUBRICANT APPLICATOR, APPLICATOR DEVICE, ASSEMBLY AND CHARGING STATION AND METHOD FOR APPLYING A SOLID LUBRICANT

(71) Applicant: TE Connectivity Germany GmbH, Bensheim (DE)

(72) Inventor: Helge Schmidt, Speyer (DE)

(73) Assignee: TE Connectivity Germany GmbH, Bensheim (DE)

( * ) Notice: Subject to any disclaimer, the term of this patent is extended or adjusted under 35 U.S.C. 154(b) by 329 days.

(21) Appl. No.: 17/554,504

(22) Filed: Dec. 17, 2021

(65) Prior Publication Data
US 2022/0193713 A1 Jun. 23, 2022

(30) Foreign Application Priority Data
Dec. 17, 2020 (DE) .......................... 102020134045.1

(51) Int. Cl.
| B05C 7/00 | (2006.01) |
| H01R 13/60 | (2006.01) |
| H02J 7/00 | (2006.01) |

(52) U.S. Cl.
CPC .............. *B05C 7/00* (2013.01); *H02J 7/0042* (2013.01); *H01R 13/60* (2013.01); *H01R 2201/26* (2013.01)

(58) Field of Classification Search
CPC ....... B05C 7/00; H02J 7/0042; H02J 2310/48; H01R 13/60; H01R 2201/26; H01R 13/02; H01R 13/03; H01R 13/04; H01R 13/10; H01R 13/502; B60L 53/16; F16N 15/00; F16N 15/02

USPC ......................................................... 320/109
See application file for complete search history.

(56) References Cited

U.S. PATENT DOCUMENTS

| 3,832,674 | A | * | 8/1974 | Florian | ................ H01R 13/523 439/819 |
| 3,909,424 | A | * | 9/1975 | Clark | ........................ C10M 7/00 508/144 |
| 4,428,092 | A | | 1/1984 | Lipari | |
| 5,100,848 | A | * | 3/1992 | Enomoto | ................ F16N 15/00 428/697 |
| 5,906,500 | A | * | 5/1999 | Kakuta | ................ H01R 13/637 439/310 |

(Continued)

FOREIGN PATENT DOCUMENTS

| CN | 1328712 A | 12/2001 |
| CN | 1662615 A | 8/2005 |

(Continued)

OTHER PUBLICATIONS

German Office Action, App No. 10 2020 134 045.1, dated Sep. 14, 2021, 3 pages.

(Continued)

*Primary Examiner* — Stacy Whitmore
(74) *Attorney, Agent, or Firm* — Barley Snyder (57) ABSTRACT

A lubricant applicator for applying a solid lubricant to an electrically conductive contact element of a plug and socket device is provided. The applicator includes an applicator section having a lubricating surface. The lubricating surface is formed by a solid body made of or containing the solid lubricant. The applicator section is sized and shaped in the form of a complementary mating contact to be engaged with or plugged together with the contact element.

22 Claims, 5 Drawing Sheets

(56) References Cited

U.S. PATENT DOCUMENTS

| | | | |
|---|---|---|---|
| 6,217,397 B1* | 4/2001 | Brammer | H01R 4/02 |
| | | | 439/874 |
| 6,565,983 B1 | 5/2003 | Arnell et al. | |
| 7,713,445 B2 | 5/2010 | Gros | |
| 8,112,026 B2 | 2/2012 | Matsumoto et al. | |
| 9,206,377 B1* | 12/2015 | Warren | C10M 141/12 |
| 10,941,901 B2 | 3/2021 | Schoenfeld et al. | |
| 10,958,006 B2 | 3/2021 | Leidner et al. | |
| 11,239,593 B2 | 2/2022 | Leidner et al. | |
| 11,517,929 B2 | 12/2022 | Schmitt | |
| 11,548,052 B2* | 1/2023 | Myers | H01R 13/04 |
| 11,867,281 B2* | 1/2024 | Böhm | F01M 1/12 |
| 11,879,196 B2* | 1/2024 | Yamashita | D05C 11/20 |
| 2008/0242157 A1 | 10/2008 | Fraone | |
| 2008/0272670 A1* | 11/2008 | Ziegert | H01R 39/58 |
| | | | 310/228 |
| 2011/0207368 A1* | 8/2011 | Takada | B60L 53/16 |
| | | | 439/519 |
| 2012/0037455 A1 | 2/2012 | Bennstedt et al. | |
| 2017/0349055 A1* | 12/2017 | Kilic | B60L 53/35 |
| 2019/0176653 A1* | 6/2019 | Fuehrer | B60L 53/16 |
| 2020/0227853 A1* | 7/2020 | Lyon | H01R 13/4223 |
| 2020/0235511 A1* | 7/2020 | Kato | C22C 27/00 |
| 2020/0292107 A1* | 9/2020 | Oshima | C25D 3/562 |
| 2021/0299730 A1* | 9/2021 | Myers | F16N 11/04 |
| 2021/0394626 A1* | 12/2021 | Genece | B60K 6/48 |
| 2022/0024328 A1* | 1/2022 | Cameron | H02J 50/80 |
| 2022/0416471 A1* | 12/2022 | Yamaguchi | H01R 13/5202 |
| 2023/0096869 A1* | 3/2023 | Garcia-Ferre | B60L 53/302 |
| | | | 320/109 |
| 2023/0138299 A1* | 5/2023 | Wiegman | B64U 50/19 |
| | | | 701/3 |
| 2023/0163541 A1* | 5/2023 | Ellensohn | H01M 50/552 |
| | | | 439/750 |
| 2023/0392312 A1* | 12/2023 | Ishii | D05B 67/00 |
| 2024/0003488 A1* | 1/2024 | Hodson | F16N 3/06 |

FOREIGN PATENT DOCUMENTS

| | | |
|---|---|---|
| CN | 201218404 Y | 4/2009 |
| CN | 201284910 Y | 8/2009 |
| CN | 101614994 A | 12/2009 |
| CN | 103415678 A | 11/2013 |
| CN | 104813411 A | 7/2015 |
| CN | 108223770 A | 6/2018 |
| CN | 108300534 A | 7/2018 |
| CN | 109196725 A | 1/2019 |
| CN | 110870142 A | 3/2020 |
| CN | 111886079 A | 11/2020 |
| DE | 16 39 075 A | 1/1971 |
| DE | 2757984 A1 | 6/1979 |
| DE | 220751 A1 | 1/1984 |
| DE | 4212207 A1 | 10/1993 |
| WO | 9829523 A1 | 7/1998 |
| WO | 2012130556 A2 | 10/2012 |
| WO | 2014044568 A1 | 3/2014 |

OTHER PUBLICATIONS

Chinese Office Action dated Feb. 26, 2024 with English translation, corresponding to Application No. 202111527928.1, 23 pages.

* cited by examiner

LUBRICANT APPLICATOR, APPLICATOR DEVICE, ASSEMBLY AND CHARGING STATION AND METHOD FOR APPLYING A SOLID LUBRICANT

CROSS-REFERENCE TO RELATED APPLICATIONS

This application claims the benefit of German Patent Application No. 102020134045.1 filed on Dec. 17, 2020, the whole disclosure of which is incorporated herein by reference in its entirety.

FIELD OF THE INVENTION

The present disclosure relates to lubrication devices, and more particularly, lubrication devices for applying solid lubricants.

BACKGROUND

Plug and socket devices are used in numerous technical fields to create detachable connections for the transmission of electrical currents and/or signals. In most cases, electrically conductive contact elements of the plug and socket devices to be connected are placed into physical contact with each other during a mating operation. In many applications, after the transmission has been completed, the connection is released again, thus completing a mating cycle. With each mating cycle, wear occurs on the contact surfaces of the plug and socket devices. This surface wear has a negative impact on the service life, maintenance frequency and/or repair requirements of the plug and socket devices.

SUMMARY

Embodiments of the present disclosure include a lubricant applicator for applying a solid lubricant to an electrically conductive contact element of a plug and socket device. The applicator includes an applicator section having a lubricating surface. The lubricating surface is formed by a solid body made of or containing the solid lubricant. The applicator section is sized and shaped in the form of a complementary mating contact to be plugged together with the contact element.

BRIEF DESCRIPTION OF THE DRAWINGS

The invention will now be described by way of example with reference to the accompanying Figures, of which.

DETAILED DESCRIPTION OF THE EMBODIMENTS

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
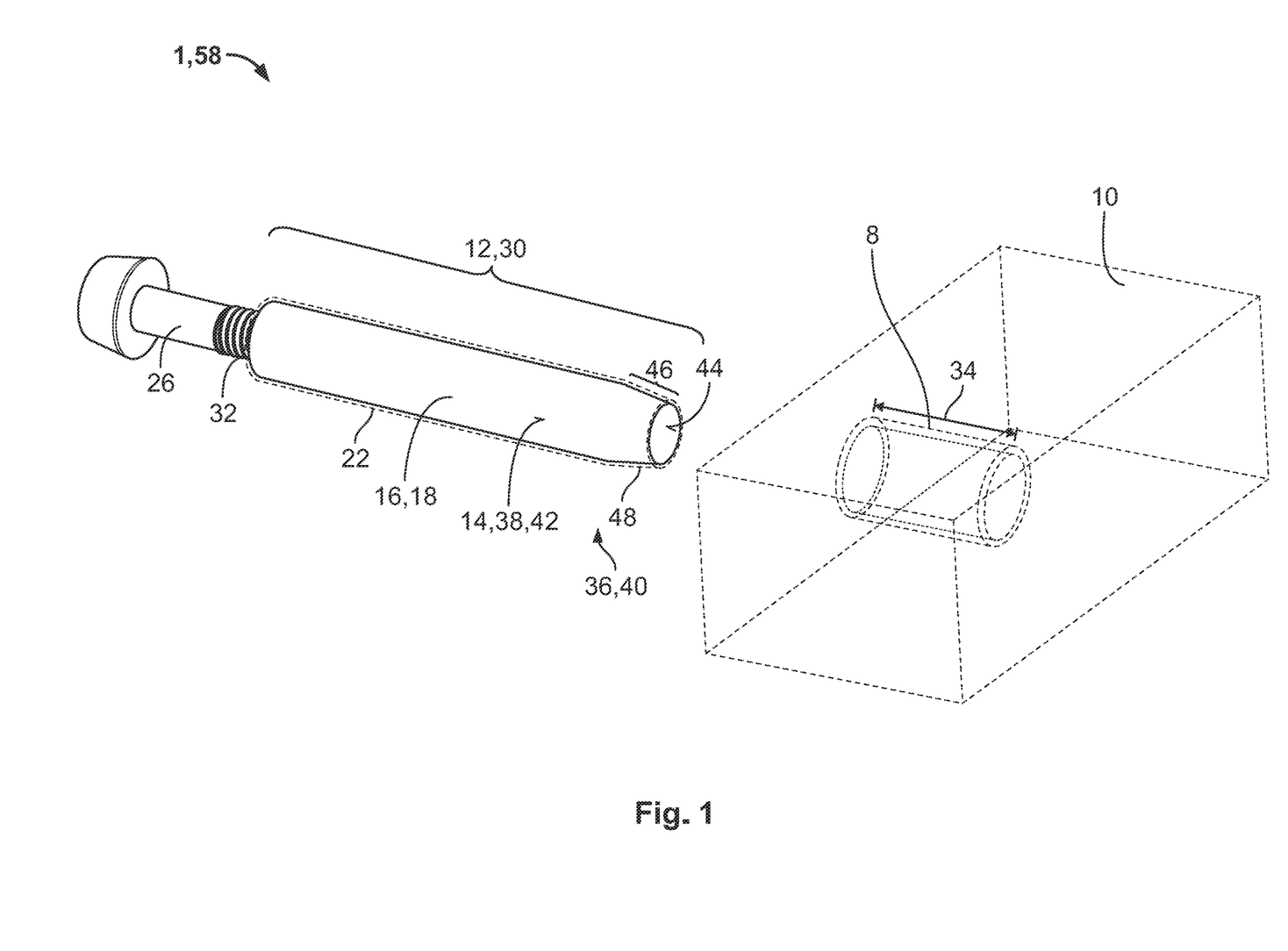
FIG. 1 shows a schematic perspective view of a lubricant applicator according to the invention, according to a first embodiment.
Figure 2:
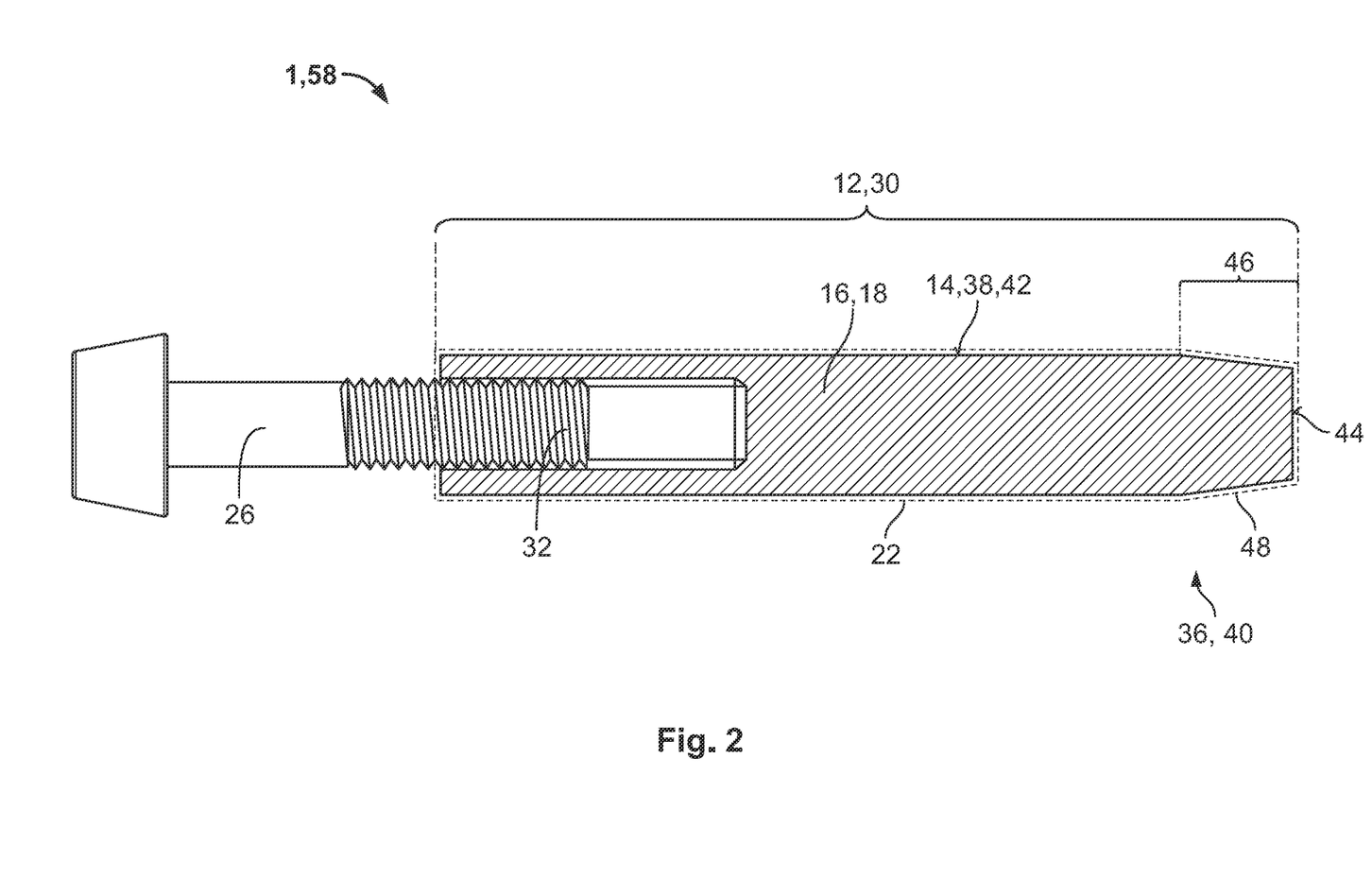
FIG. 2 shows a schematic sectional view of the lubricant applicator of FIG. 1.
Figure 3:
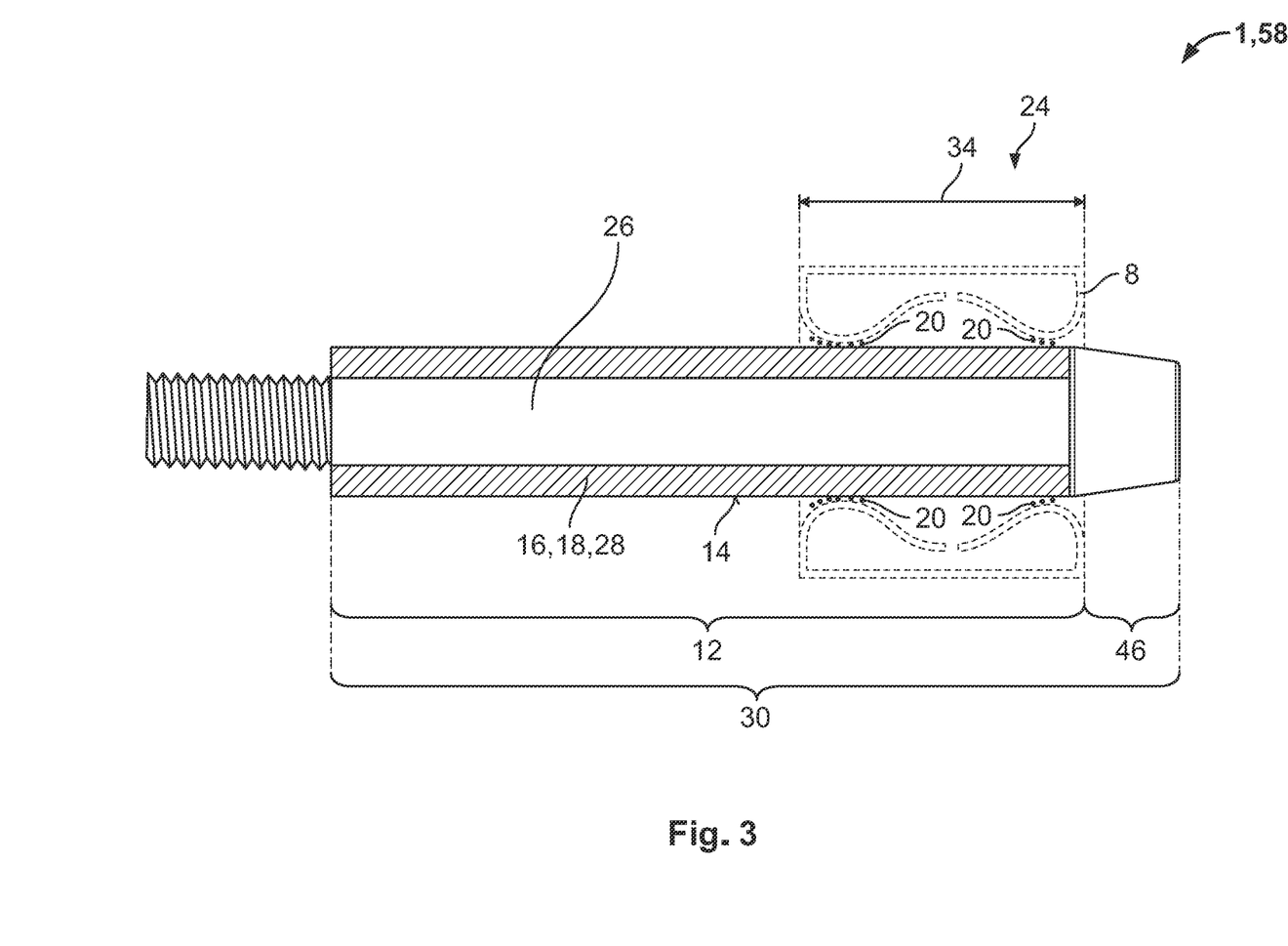
FIG. 3 shows a schematic sectional view of a lubricant applicator according to the invention, according to a second embodiment.

As schematic structure of exemplary embodiments of a lubricant applicator 1 according to the present disclosure is shown with reference to FIGS. 1-3. A schematic structure of an exemplary embodiment of an applicator device 2 according to the present disclosure and of an exemplary embodiment of an assembly 4 according to the present disclosure are described with reference to FIG. 4. Finally, a schematic structure of a possible embodiment of a charging station 6 according to the present disclosure is shown in FIG. 5.

As shown in FIG. 1, the lubricant applicator 1 according to the invention for applying a solid lubricant to an electrically conductive contact element 8 of a plug and socket device 10 may include an applicator section 12 having a lubricating surface 14 for contacting the contact element 8. The contact element 8 and the plug and socket device 10 are shown in FIG. 1 in simplified form by dashed lines. According to the embodiment, the lubricating surface 14 is formed by a solid body 16 made of or containing the solid lubricant. In particular, the solid body 16 is a solid, coherent body 18, which consists entirely of the solid lubricant or contains the solid lubricant as a component. From the solid body 16, platelet or powdered abrasion 20 can be formed (see FIG. 3), which also consists of or contains the solid lubricant.

The lubricant applicator 1 is adapted to be plugged together with the contact element 8 in that the applicator section 12 is configured (e.g., sized) in the form of a mating contact (not shown) complementary to the contact element 8. When the lubricant applicator 1 is plugged together with the contact element 8 and when they are pulled apart, the lubricating surface 14 of the applicator section 12 moves along the contact element 8 while generating the abrasion 20 on the lubricating surface 14. Thus, a layer of solid lubricant is applied to the contact element 8. In other words, the contact element 8 is lubricated with the solid lubricant. This process corresponds to steps of the method according to the present disclosure. Preferably, the method according to the invention is carried out in an electrically inactive state of the plug and socket device 10.

If the plug and socket device 10 complies with a known standard, a design 22 of the applicator section 12 may correspond, at least in sections, to the geometry of a mating contact (not shown) defined in this standard and complementary to the contact element 8. In particular, the lubricating surface 14 may be configured in the form of a contact surface (not shown) of the mating contact thus defined. In this way, it is ensured that the lubricating surface 14 bears against the contact element 8, preferably in a frictional manner, in the state 24 of the lubricant applicator 1 plugged together with the contact element 8 (see FIG. 3).

The lubricant applicator 1 may comprise a support body 26 on which the solid body 16 forming the lubricating surface 14 is located. In particular, the solid body 16 may be screwed to the support body 26 (see FIG. 2). Alternatively, the solid body 16 may be adhesively applied to the support body 26 as a layer of material 28 (see FIG. 3). According to a further alternative not shown, the lubricant applicator may also consist entirely of the solid lubricant.

As further shown in FIG. 1, the lubricating surface 14 may be located at least in a front region 30 of the lubricant applicator 1 facing the plug and socket device 10. In the exemplary embodiment shown in FIGS. 1 and 2, the solid body 16 and thus the lubricating surface 14 is arranged on a tip 32 of the carrier body 26 facing the plug and socket device 10. In this way, it is ensured that lubrication of the contact element 8 occurs preferably over the entire length 34 of the contact element 8.

Still referring to FIG. 1, the lubricating surface 14 may face outwardly with respect to the support body 26 and be located externally. In the exemplary embodiment shown in FIGS. 1 and 2, the applicator section 12 is in the form of a contact pin 36, with the lubricating surface 14 at least partially forming an outer surface 38 of the contact pin 36. In particular, the applicator section 12 is configured as a cylindrical contact pin 40 having a circular base. In this regard, the lubricating surface 14 at least partially forms a shell surface 42 and a top surface 44 of the cylindrical contact pin 40. The contact pin 40 shown further comprises a conical portion 46 having an insertion chamfer 48. The conical portion 46 may also be part of the carrier body (see FIG. 3).

Alternatively, the lubrication surface 14 may face inwardly or lie inwardly with respect to the support body 26. Further alternatively, the applicator section 12 and/or the support body 26 may also be conical, prism-shaped, pyramid-shaped, or a combination of the preceding shapes.

Figure 4:
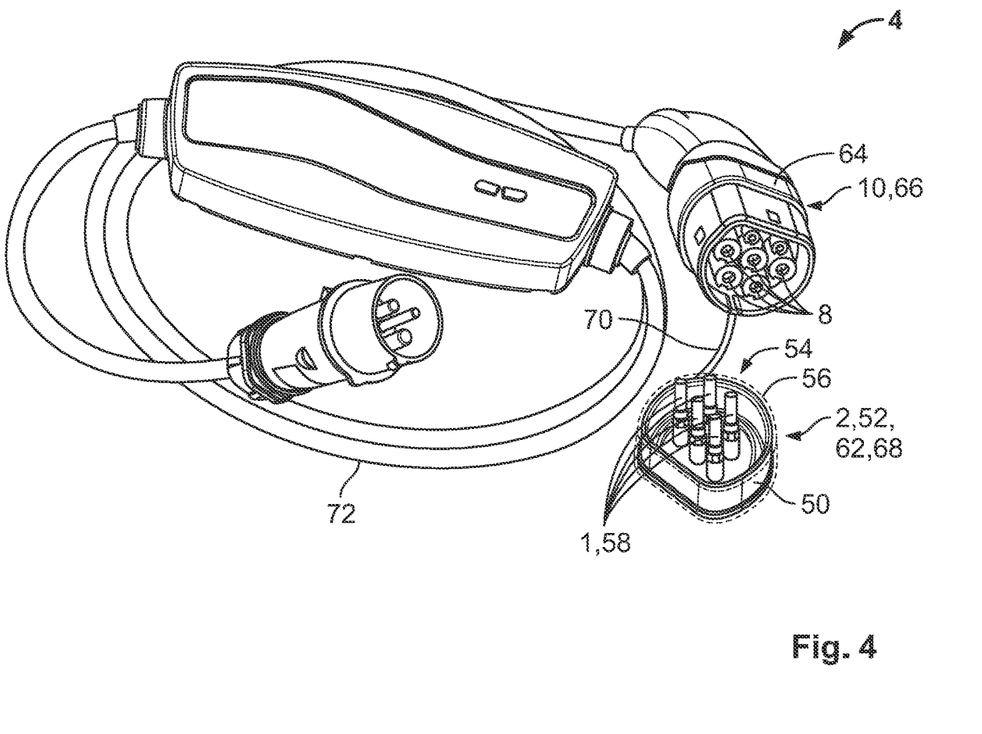
FIG. 4 shows a schematic perspective view of an assembly according to the invention.
Figure 5:
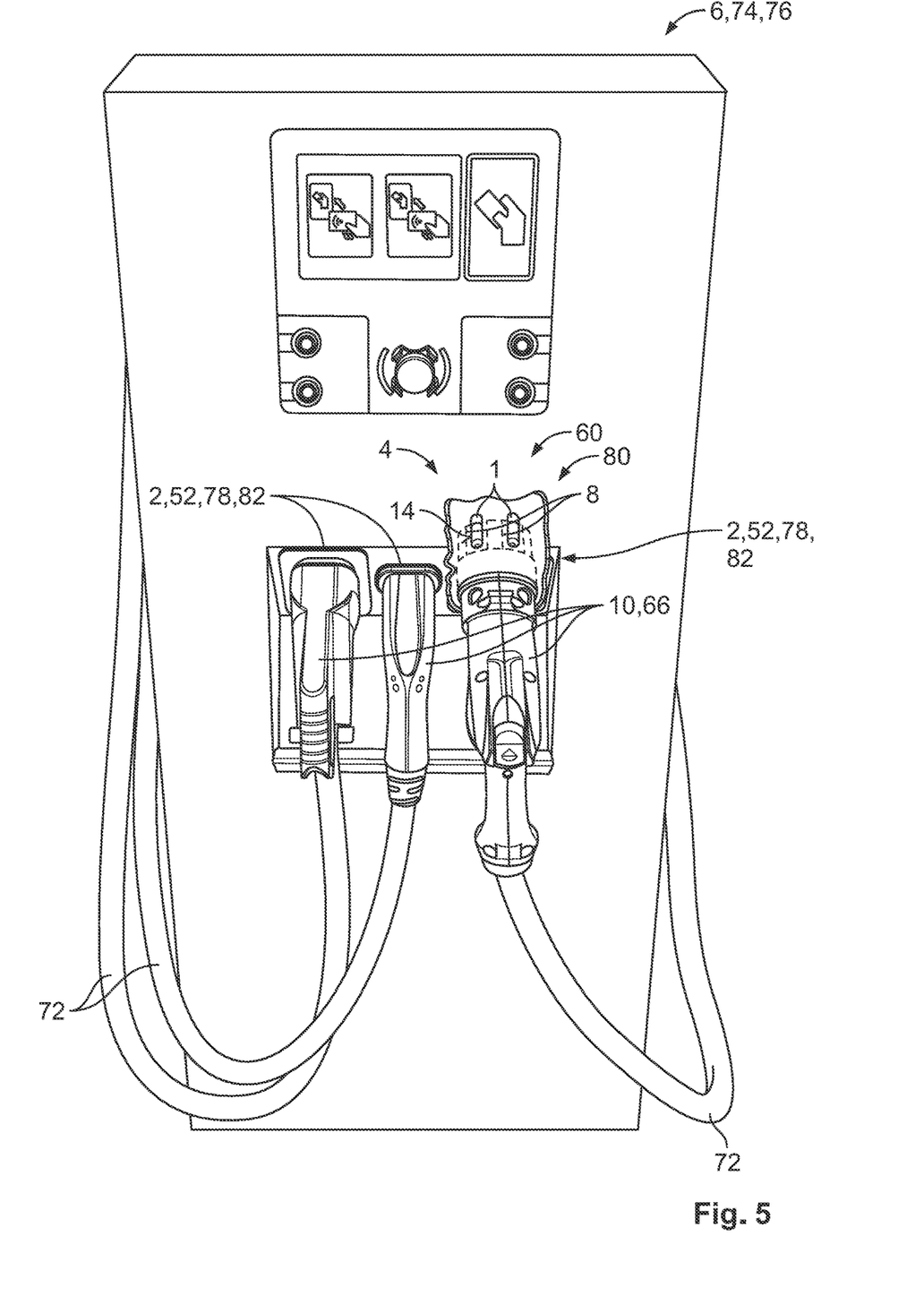
FIG. 5 shows a schematic perspective view of a charging station according to the invention.

Referring to FIG. 4, the applicator device 2 according to the invention is shown in an exemplary embodiment, wherein the applicator device 2 comprises at least one lubricant applicator 1 according to one of the embodiments described above, and a base body 50 on which the at least one lubricant applicator 1 is arranged. The applicator device 2 is further configured as a preferably blind counterpart 52 of the plug and socket device 10 that is pluggable with the plug and socket device 10. In the exemplary embodiment of the applicator device 2 shown in FIG. 4, the base body 50 has a connector face 54 shaped to complement the plug and socket device 10. The at least one lubricant applicator 1 is arranged in the connector face 54.

If the connector 10 complies with a standard or norm, a design 56 of the mating face 54 may correspond, at least in sections, to the design of a mating face defined in the standard or norm of a mating device (not shown) complementary to the plug and socket device 10. Furthermore, the position of the at least one lubricant applicator 1 in the connector face 54 may correspond to a position of the mating contact (not shown) defined in the standard or norm and complementary to the contact element 8.

The applicator device 2 according to the invention may also include a plurality of lubricant applicators 1. In the exemplary embodiment of the applicator device 2 shown in FIG. 4, five lubricant applicators 1 are provided, as the plug and socket device 10 comprises five contact elements 8 to be lubricated. Preferably, the applicator device 2 comprises a lubricant applicator 1 for each contact element 8 of the plug and socket device 10. Furthermore, the applicator device 2 may also comprise lubricant applicators 1 for any shielding contacts (not shown) of the plug and socket device 10.

In the exemplary embodiment shown in FIG. 4, the lubricant applicators 1 are each spaced apart from one another by sufficient air gaps so as to be electrically insulated from one another. The electrical insulation may additionally or alternatively be accomplished by means of a separation of the lubricant applicators 1 by a wall portion (not shown) of the base body 50. Furthermore, in the exemplary embodiment shown in FIG. 4, the lubricant applicators 1 are configured to be interchangeable. In particular, each lubricant applicator 1 is configured as an interchangeable applicator element 58. Each applicator element 58 is adapted to be repeatedly attachable to and non-destructively detachable from the base body 50 via a screw, press, clamp and/or snap connection.

FIG. 4 further shows the assembly 4 according to the invention in an exemplary embodiment, including an applicator device 2 according to one of the embodiments described above and a plug and socket device 10 with at least one electrically conductive contact element 8. In the state 60 assembled with the plug and socket device 10 (see FIG. 5) of the applicator device 2, the lubricating surface 14 of the at least one lubricant applicator 1 of the applicator device 2 is in frictional contact with the at least one contact element 8. In other words, in the state 60 of the applicator device 2 assembled with the plug and socket device 10, there is static friction between the lubricating surface 14 and the at least one contact element 8.

In the exemplary embodiment shown in FIG. 4, the applicator device 2 and in particular its base body 50 is configured as a mountable and removable cover 62 for covering the plug and socket device 10. In this case, the base body 50 forms the cover 62 completely. Alternatively, the cover 62 may also be formed in parts by the carrier body 26.

Furthermore, the applicator device 2 is held on the plug device 10. In particular, the plug and socket device 10 comprises a housing 64 in which the at least one contact element 8 is arranged so as to be accessible from the outside and on which the applicator device 2 is held. The plug and socket device 10 shown in FIG. 4 is a charging plug 66 for an electric vehicle (not shown). Accordingly, the applicator device 2 is configured as a cap 68 for the charging plug 66 and is captively held to the housing 64 by a band 70. Alternatively, the plug and socket device 10 may be a charging socket (not shown) on the vehicle. In this case, the applicator device 2 may be configured as a cover (not shown) for this charging socket and may be pivotally held on the body of the electric vehicle by a hinge, for example.

FIG. 5 shows an exemplary embodiment of the charging station 6 according to the disclosure for an electric vehicle (not shown). The charging station 6 comprises an assembly 4 according to one of the preceding embodiments, wherein the plug and socket device 10 of the assembly 4 is configured as a charging plug 66 of a charging cable 72 for connection to a charging socket (not shown) of the electric vehicle. The applicator device 2 of the assembly 4 is configured at least in sections in the form of the charging socket of the electric vehicle. In this case, the charging cable 72 leads to a power source (not shown) with which the charging station 6 is supplied.

In the embodiment shown, the charging station 6 is a public charging point 74. In particular, the charging station 6 is a fast-charging station 76. The charging station 6 is configured to electrically charge an energy storage device (not shown) of the connected electric vehicle via the charging plug 66 in a charging mode. Depending on the application, the charging station 6 may comprise any number of further charging cables 72 and further assemblies 4.

In the embodiment shown in FIG. 5, the applicator device 2 of the assembly 4 is configured as a holder 78 to which the charging plug 66 is attachable. In particular, the charging plug 66 can be placed in the holder 78 before and/or after each charging operating state, i.e., in a standby state 80. For this purpose, the applicator device 2 is installed in the charging station 6 and serves as a blind socket 82 for the charging plug 66.

According to an embodiment not shown, a charging station which has already been constructed and which comprises blind sockets for holding its charging plugs can be upgraded according to the invention by fixing a suitable number of lubricant applicators according to the invention in the respective blind sockets.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A lubricant applicator for applying a solid lubricant to an electrically conductive contact element of a plug and socket device, comprising:
   an applicator section having a lubricating surface formed by a solid body made of or containing the solid lubricant, the applicator section is sized and shaped in the form of a complementary mating contact to be plugged together with the contact element; and
   a base body on which the applicator section is arranged, the base body defining a cover forming a joinable counterpart of the plug and socket device, wherein with the cover fully joined to the plug and socket device, only the lubricating surface of the applicator section is in contact with the electrically conductive contact element.

2. The lubricant applicator according to claim 1, further comprising a support body on which the solid body forming the lubricating surface is arranged, the support body made of a material different from the solid lubricant.

3. The lubricant applicator according to claim 1, wherein the lubricating surface is located at least in a front region of the lubricant applicator for facing the plug and socket device.

4. The lubricant applicator according to claim 1, wherein the entire applicator section is formed from the solid lubricant and is shaped as a contact pin.

5. The lubricant applicator according to claim 1, wherein the applicator section is removably attached to the base body.

6. The lubricant applicator according to claim 1, further comprising a plurality of applicator sections arranged on the base body, each of the applicator sections being electrically insulated from each other.

7. The lubricant applicator according to claim 6, wherein each of the plurality of applicator sections are attached to a respective support body made of a material distinct from the solid lubricant.

8. The lubricant applicator according to claim 7, wherein each lubricating surface is located at least in a front region of the applicator section for facing the plug and socket device.

9. The lubricant applicator according to claim 8, wherein each applicator section is formed as contact pin for engaging with the plug and socket device.

10. The lubricant applicator according to claim 1, wherein no electrically conductive pathway through the cover is formed with the cover joined to the plug and socket device.

11. The lubricant applicator according to claim 1, wherein the cover does not define a mating connector for passing electrical current from the plug and socket device and through the cover.

12. The lubricant applicator according to claim 1, wherein the entire applicator section is formed from the solid lubricant.

13. A lubricating assembly, comprising:
   an applicator device, including:
     at least one lubricant applicator including an applicator section having a lubricating surface, the lubricating surface formed by a solid body made of or containing a solid lubricant; and
     a base body on which the at least one lubricant applicator is arranged; and
   a plug and socket device discrete from the applicator device and having at least one electrically conductive contact element, the lubricating surface of the at least one lubricant applicator of the applicator device frictionally engages the at least one contact element with the applicator device assembled with the plug and socket device, wherein the base body and the at least one lubricant applicator form a joinable counterpart of the plug and socket device containing the at least one contact element, the applicator device being removably attachable to a plugging end of the plug and socket device, wherein with the applicator device attached to the plug and socket device, no mating connection for passing electrical current from the plug and socket device and through the applicator device is formed.

14. The assembly according to claim 13, wherein the applicator section is sized and shaped in the form of a complementary mating contact to be plugged together with the at least one contact element to the plugging end of the plug and socket device.

15. The assembly according to claim 13, wherein the at least one contact element comprises a plating.

16. The assembly according to claim 13, wherein the applicator device is selectively fixable on the plug and socket device and applies lubricant to a contact surface of the at least one contact element, the contact surface adapted to engage with a corresponding contact surface of a mating connector.

17. The assembly according to claim 13, wherein with the applicator section plugged together with the contact element, only the lubricating surface is in contact with the contact element.

18. A charging station for an electric vehicle, comprising:
a lubricating assembly fixed to the charging station and comprising an applicator device including a lubricant applicator having an applicator section with a lubricating surface, the lubricating surface formed by a solid body made of or containing a solid lubricant, and a base body on which the lubricant applicator is arranged; and
a charging cable including a charging plug, the charging plug comprising a plug and socket device having at least one electrically conductive contact element defining a contact surface adapted to contactingly engage with a mating contact of the electric vehicle, the lubricating surface of the lubricant applicator of the applicator device frictionally engages the contact surface of the at least one contact element with the applicator device assembled with the plug and socket device with the plug and socket device removed from the electric vehicle and installed into the lubricating assembly of the charging station.

19. The charging station according to claim 18, wherein the plug and socket device is sized to connect to a charging socket of the electric vehicle, the applicator device of the assembly is sized and shaped at least in sections in the form of the charging socket of the electric vehicle, with the applicator device assembled with the plug and socket device, the plug and socket device is not mateable to the charging socket of the electric vehicle.

20. The charging station according to claim 18, wherein the applicator device of the assembly defines a holder to which the charging plug is attachable when the charging plug is not engaged with the mating contact of the electric vehicle.

21. A lubricant applicator for applying a solid lubricant to an electrically conductive contact element of a plug and socket device, comprising:
an applicator section having a lubricating surface formed by a solid body made entirely of or containing the solid lubricant over an entire exterior surface thereof that is adapted to contact the electrically conductive contact, the applicator section is sized and shaped in the form of a complementary mating contact to be plugged together with the contact element; and
a support body, distinct from the applicator section, to which the solid body is attached, the support body made of a material different from the solid body and defining a threading, the threading engaging with the solid body for removably securing the solid body to the support body.

22. The lubricant applicator according to claim 21, wherein with the applicator section fully joined to the plug and socket device, only the lubricating surface is in contact with the electrically conductive contact element.

* * * * *